United States Patent [19]
Guisinger et al.

[11] 3,890,558

[45] June 17, 1975

[54] VOLTAGE CONTROLLED BI-DIRECTIONAL STABLE SOURCE APPARATUS

[75] Inventors: Barrett Earl Guisinger, Saratoga; Bert H. Dann, Mountain View, both of Calif.

[73] Assignee: International Video Corporation, Sunnyvale, Calif.

[22] Filed: Apr. 27, 1973

[21] Appl. No.: 355,220

[52] U.S. Cl. ............... 323/4; 178/6.6 TC; 307/296; 307/310; 323/19

[51] Int. Cl. ............................................. G05f 3/02

[58] Field of Search........ 307/130, 228, 235 R, 261, 307/310, 296; 323/1, 4, 16, 19; 328/35; 330/17, 18

[56] References Cited

UNITED STATES PATENTS

| | | | |
|---|---|---|---|
| 3,401,346 | 9/1968 | Brown et al. | 328/35 X |
| 3,457,493 | 7/1969 | Shoemaker et al. | 323/4 |
| 3,636,384 | 1/1972 | Dewitt | 307/310 X |
| 3,684,973 | 8/1972 | Duck | 330/17 X |
| 3,716,722 | 2/1973 | Bryant et al. | 307/310 X |

*Primary Examiner*—A. D. Pellinen
*Attorney, Agent, or Firm*—Limbach, Limbach & Sutton

[57] ABSTRACT

A velocity error voltage in a VTR is derived by phase comparison of the off-tape horizontal sync pulses with reference sync pulses prior to a one horizontal line delay having a non-critical delay time in the signal path. The DC error voltage controls a ramp voltage which is added to the chrominance error detector voltage for control of a variable delay line in the signal path. The voltage controlled bi-directional current source circuit is particularly suitable in this environment for accurately converting the velocity error voltage to a stable current for charging a capacitor to provide the ramp correction voltage for control of the variable delay line.

2 Claims, 2 Drawing Figures

VOLTAGE CONTROLLED BI-DIRECTIONAL STABLE SOURCE APPARATUS

BACKGROUND OF THE INVENTION

This invention relates to voltage controlled current source circuit apparatus and, more, particularly to such apparatus for providing a stable current having a polarity and magnitude responsive to the polarity and magnitude of an input DC voltage, hence, a "bi-directional" current source.

The invention is particularly suitable for use in the velocity compensator phase correction circuitry of a videotape recorder (VTR) where a highly accurate current source responsive to a control voltage is required for the charging of a capacitor.

In accordance with the preferred embodiment of the present invention, a voltage-controlled bi-directional current source is provided for providing a stable current having a polarity and magnitude responsive to the polarity and magnitude of an input DC voltage. The circuit is usable in many environments. One particular environment is in a VTR where the DC velocity error voltage output of the velocity compensator error detector must be converted to a ramp voltage. A ramp may easily be generated by charging a capacitor from a current source. The precise accuracy of the correction ramp and, consequently, correction of the velocity error depends on the stability of the charging current source.

These and other advantages of the present invention will be better understood as this specification and drawings are read and understood.

DETAILED DESCRIPTION OF THE PREFERRED EMBODIMENTS

Figure 1:
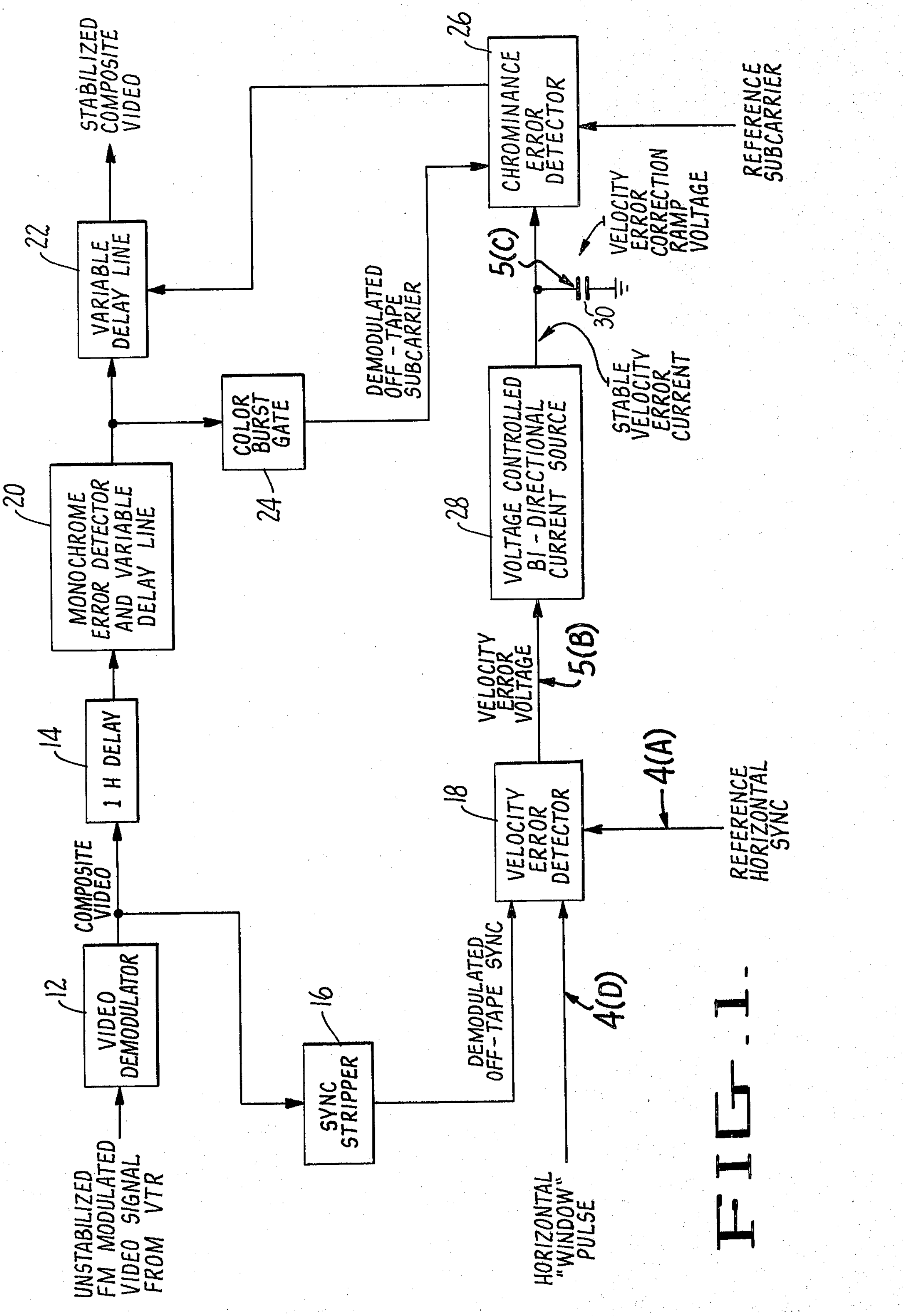
FIG. 1 is a block diagram of an overall phase correction system for color video playback in a VTR showing the environment of the bi-directional current source of the present invention.

FIG. 1 shows in block diagrammatical form the overall color phase compensation system for a VTR according to the present invention. The unstabilized off-tape signal, which is typically a frequency modulation of pulse-interval modulation signal, is applied to a video demodulator 12. One preferred form of such a demodulator is disclosed in the copending application of Bert H. Dann, Ser. No. 285,924, filed Sept. 1, 1972. A composite color video signal is applied to a one horizontal line delay (hereinafter referred to as a "1H delay") 14 and to a conventional sync stripper 16. The composite video signal can be according to any of the world standards including NTSC, PAL, PAL-M, SECAM, etc. The invention is equally applicable to all such systems. The 1H delay 14 need not be a precision delay line, for example, a delay of one horizontal line time plus or minus 0.5$\mu$s is suitable. A delay line of this type is relatively inexpensive compared to precision delay lines or complex arrangements for continually re-calibrating a delay line.

A velocity error detector 18 receives the off-tape sync, including horizontal, vertical and equalizing pulses, from sync stripper 16. Only the horizontal synchronizing pulses are used by velocity error detector 18, however. Detector 18 also receives a reference horizontal sync input which can be any source of stable sync signals whether internal or external to the VTR including a stable oscillator in the VTR and the station sync in a television studio, for example. A third input to detector 18 are horizontal "window" pulses which "window" the leading edge of each off-tape horizontal sync pulse. The window pulses are generated from the off-tape horizontal pulses by an off-tape sync processing circuit (not shown) which forms no part of the present invention. Such processing circuits are well known in the art. Detector 18 provides a DC output voltage which is updated by each reference horizontal sync pulse. The DC voltage output corresponds to the difference in phase error between the off-tape horizontal sync pulse and the reference horizontal sync pulse of consecutive horizontal lines which is a direct indication of the "velocity" error along that horizontal television line.

The velocity error voltage relates to the real time off-tape horizontal line that just ended, hence, the 1H delay 14 is used to delay the composite color video signal so that the measured error for that line is actually used to correct the same line.

The 1H delay 14 output is applied first to a conventional monochrome error detector and variable delay line 20. Such devices are well known in the art and are sometimes referred to as a coarse time base error corrector. Ordinarily such units compare off-tape horizontal (in this case, delayed 1H) to reference horizontal and use the detected phase difference to electronically control a delay line in the composite signal path. The output signal from block 20 is thus stabilized sufficiently to provide an acceptable monochrome signal. It should be noted that this correction assures that the beginning of each horizontal line is nearly in phase with the reference horizontal and thus does not provide correction for progressive phase error through the horizontal line which is provided by "velocity" compensation.

The output of block 20 is applied to the chrominance or vernier time base error corrector comprising a variable delay line 22, a color burst gate 24 and a chrominance error detector 26. Detector 26 compares the phase of the off-tape chrominance subcarrier to a reference chrominance subcarrier and provides an error signal to adjust delay line 22 to correct any remaining phase error at the beginning of the horizontal line. The reference signal is derived internally in the VTR by a stable oscillator or externally in the television studio, for example.

The velocity error measurement from detector 18 is an indication of the phase error at the end of the horizontal line. The phase error at the beginning of the horizontal line is corrected by the monochrome and chrominance error detectors and delay lines. Thus, as is well known in the art, the velocity compensating signal is properly a linear ramp beginning at zero at the start of the horizontal line and reaching the measured error at the end of the line. A preferred embodiment to implement this approach in the present invention is to apply the DC velocity error voltage from detector 18 to a voltage controlled bi-directional current source 28, which is shown in greater detail in FIG. 2. Current source 28 generates a highly stable current having a polarity and amplitude controlled by the DC input voltage. The stable output current from source 28 charges a capacitor 30. The resulting ramp voltage on the capacitor is added to the chrominance phase error voltage for control of delay line 22. In order to provide an accurate velocity error voltage ramp on the capacitor 30, it is extremely important that the current from source 28 remain constant in response to a given DC input voltage in order that the ramp voltage is accurate. Relatively small deviations and perturbations in the ramp voltage can result in erroneous phase corrections by delay line 22.

Figure 2:
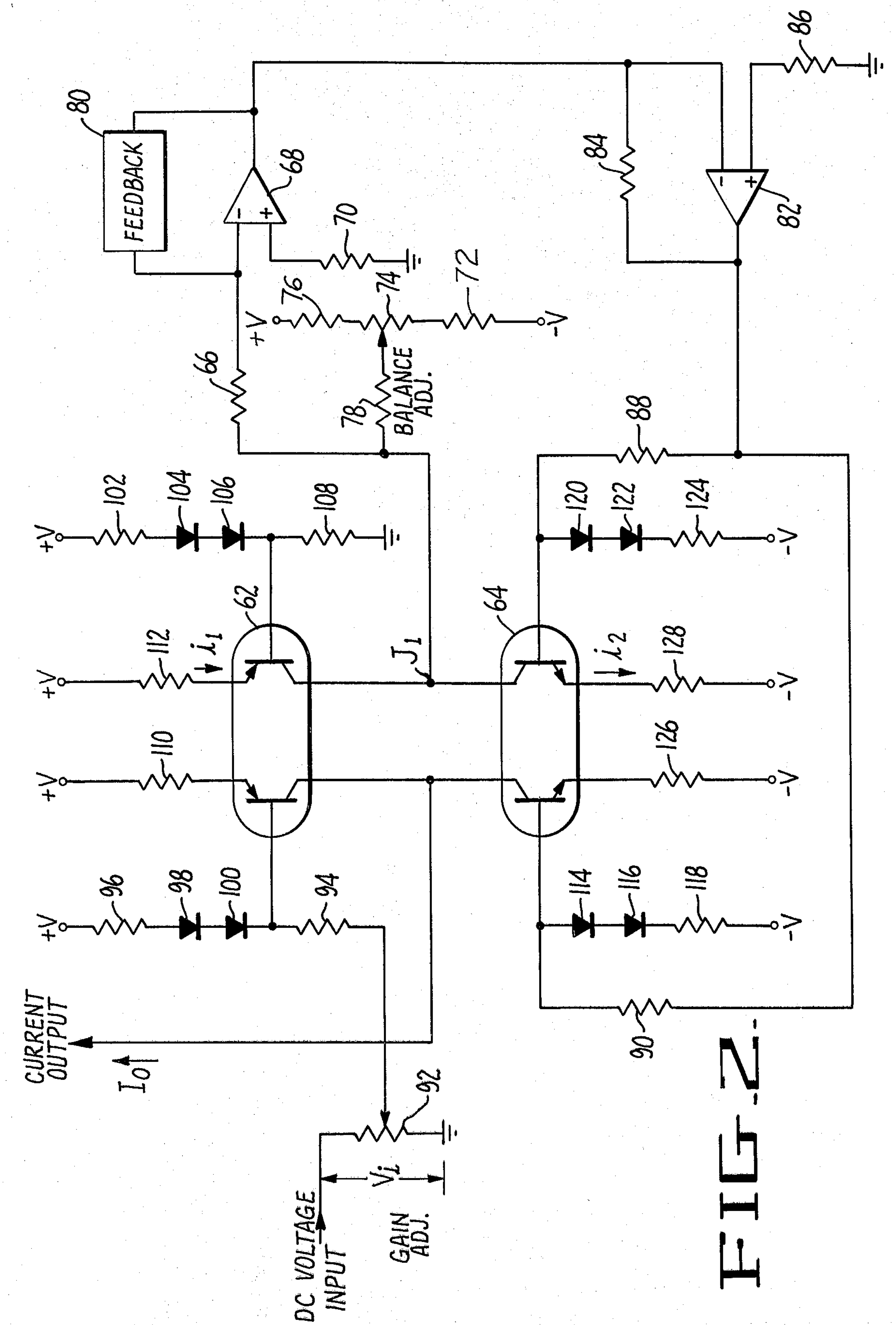
FIG. 2 is a schematic circuit diagram showing the voltage controlled bi-directional current source of FIG. 1 in greater detail.

Referring now to FIG. 2 which shows the voltage controlled bi-directional current source 28 of FIG. 1 in greater detail. The circuit provides an output current $I_o$ which is proportional to the input voltage, $V_i$:

$$I_o = kV_i$$

for both negative and positive polarities of $V_i$. The circuit can be viewed as an accurate adjustable gain amplifier having an upper PNP transistor pair 62 on the same chip in cooperation with a lower NPN transistor pair 64 on the same chip (two chips total). Alternately, both pairs 62 and 64 can be on a single chip (one chip total). The lower pair 64 acts as a pair of current sources the polarity and magnitude of which is controlled by the upper pairs 62. The right-hand transistors of pairs 62 and 64 are arranged in a closed loop feedback arrangement to correct for unwanted changes in gain of the devices due to temperature shifts, changes in component values, changes in power supply voltage and such. The error correction voltage is also applied to the lower left-hand side of pair 64 under the assumption that any variations in the right-hand transistors will also occur with respect to the left-hand transistors because they are on the same chips. The left-hand side, of course, continues to function open loop.

More specifically, the junction $J_1$ between the collector of the right-hand transistor of pair 62 and the collector of the right-hand transistor of pair 64 is connected through an input resistor 66 to the negative input of an operational amplifier 68 acting as a comparator. The positive input of amplifier 68 is connected to ground through a resistor 70, hence the voltage at $J_1$ is compared to ground. A balance adjustment to adjust for zero voltage at $J_1$ is provided by a series resistor 72, potentiometer 74 and resistor 76 connected between +V and −V and a resistor 78 between junction $J_1$ and the wiper of potentiometer 74. A feedback network 80 is connected between the amplifier output and negative input as is conventional. The amplifier 68 output is applied to the negative input of an inverting buffer amplifier which has a feedback resistor 84. The positive input is grounded through a resistor 86. The correction voltage from amplifier 82 is connected through resistors 88 and 90, respectively, to the bases of the transistors in pair 64 in order to control their gain to provide the compensation necessary to maintain junction $J_1$ at zero volts. The compensation voltage assures that the current generated by the left-hand transistor of pair 64 is unaffected by temperature and other factors as mentioned above.

Referring to other details of the circuit of FIG. 2, the DC input voltage, $V_i$, is applied across a potentiometer 92 which adjusts the relative gain of the circuit. The wiper of potentiometer 92 is connected to the base of the left-hand transistor of pair 62 through a resistor 94. Bias is also applied to the base from a positive voltage source +V through a resistor 96 and pair of diodes 98 and 100, which provide greater stabilization. The base of the right-hand transistor of pair 62 is also connected to +V through a resistor 102 and diodes 104, 106 and to ground through a resistor 108. The emitters of the transistors in pair 62 are connected to +V through resistors 110 and 112, respectively. In a complementary manner the bases of the transistors of pair 64 are biased by connection to −V through series diodes 114, 116 and resistor 118 and through series diodes 120, 122 and resistor 124, respectively. The emitters of the transistors of pair 64 are connected to −V through resistors 126 and 128, respectively.

Examples of actual components and circuit elements used in a working embodiment of the embodiment of FIG. 2 are as follows:

| | |
|---|---|
| transistor pair 62 | 2N 4937 |
| transistor pair 64 | CA 3018A |
| resistor 66 | 1 megohm |
| amplifier 68 | operational amplifier |
| resistor 70 | 510 KΩ |
| resistor 72 | 10 KΩ |
| potentiometer 74 | 1000 Ω |
| resistor 76 | 10 KΩ |
| resistor 78 | 1 megohm |
| feedback 80 | 22 megohm in parallel with 0.01 μFd. |
| amplifier 82 | operational amplifier |
| resistor 84 | 100 KΩ |
| resistor 86 | 9100 Ω |
| resistor 88, 90, 94, 108 | 182 KΩ |
| potentiometer 92 | 1000 Ω |
| resistors 96, 102, 118, 124 | 200KΩ |
| diodes 98, 100, 104, 106, 114, 116, 120, 122 | 1N 4154 |
| resistors 110, 112, 126, 128 | 49.9KΩ |
| (all resistors associated with pairs 62 and 64 and ½% tolerance) | |
| +V | +12 volts |
| −V | −12 volts |

Other ways of implementing the voltage controlled bi-directional current source of the present invention will occur to those of ordinary skill in the art, thus the embodiment of FIG. 2 and examples of components are set forth only as the best mode presently contemplated by the inventors and are not to be considered limiting. The scope of the invention is set forth by the appended claims.

We claim:

1. Voltage controlled current source apparatus comprising first and second independently amplifying voltage controlled amplifier means, said amplifier means including first and second solid state devices arranged on a single chip, first and second current source means connected to each of said amplifier means, respectively, for generating respective currents proportional to voltages applied to said amplifier means, said first current source current taken as the output current, said current source means including first and second solid state devices arranged on a single chip, means for applying a control voltage to said first amplifier means, means for applying a reference voltage to said second amplifier means, comparator means receiving the current from said second current source for comparing said second current source current to a reference for generating a comparator error voltage proportional to the difference between said second current source current and said reference, and means for applying said comparator error voltage to said first and second current source means to drive said second current source current to the level of said reference level whereby said first current source current is stabilized.

2. The combination of claim 1 wherein said solid state devices comprise transistors.

* * * * *

UNITED STATES PATENT OFFICE

CERTIFICATE OF CORRECTION

Patent No. 3,890,558 Dated June 17, 1975

Inventor(s) Barrett Earl Guisinger et al.

It is certified that error appears in the above-identified patent and that said Letters Patent are hereby corrected as shown below:

In the title, after "STABLE" insert -- CURRENT --.

Column 1, line 48, "of" should read -- or --.

Column 4, line 35, "and" should read -- are --.

Column 6, line 1, cancel "level" .

Signed and Sealed this

*third* Day of *February 1976*

[SEAL]

*Attest:*

RUTH C. MASON
*Attesting Officer*

C. MARSHALL DANN
*Commissioner of Patents and Trademarks*